United States Patent [19]

Grey et al.

[11] Patent Number: 4,605,681

[45] Date of Patent: Aug. 12, 1986

[54] THERMOSETTING POLYURETHANES

[75] Inventors: Peter J. Grey; Kevin Gardner, both of Burton on Trent, United Kingdom

[73] Assignee: BTR plc, London, United Kingdom

[21] Appl. No.: 747,831

[22] Filed: Jun. 24, 1985

[30] Foreign Application Priority Data

Jun. 26, 1984 [GB] United Kingdom ............... 8416320

[51] Int. Cl.$^4$ ............................................. C08G 18/14
[52] U.S. Cl. ..................................... 521/51; 521/159; 521/170; 521/176; 528/49
[58] Field of Search .............. 521/51, 159, 170, 176; 528/49

[56] References Cited

U.S. PATENT DOCUMENTS 4,101,704  7/1978  Hiles .................................. 428/313.3
4,280,944  7/1981  Saito et al. ............................. 528/49

Primary Examiner—Maurice J. Welsh
Attorney, Agent, or Firm—Watson, Cole, Grindle & Watson

[57] ABSTRACT

A thermoset polyurethane material which exhibits high, temperature-insensitive damping over a broad temperature range and has a tan δ (as hereinbefore defined) greater than 0.1 over the temperature range of from −40° C. to 60° C., a hardness in the range of from 0 to 90 Shore A, a compression set (as hereinbefore defined) of less than 15% and a tensile strength (as hereinbefore defined), of less than 30 kg/cm$^2$, the polyurethane material being prepared by the reaction of (a) an essentially primary hydroxyl tipped polyol having a molecular weight in the range of from 2,500 to 8,000;
(b) a polyhydric alcohol;
(c) an aliphatic monohydric primary alcohol containing up to 10 carbon atoms; and
(d) a polyisocyanate, the reaction being carried out at a isocyanate index of 1.0 or greater.

15 Claims, 2 Drawing Figures

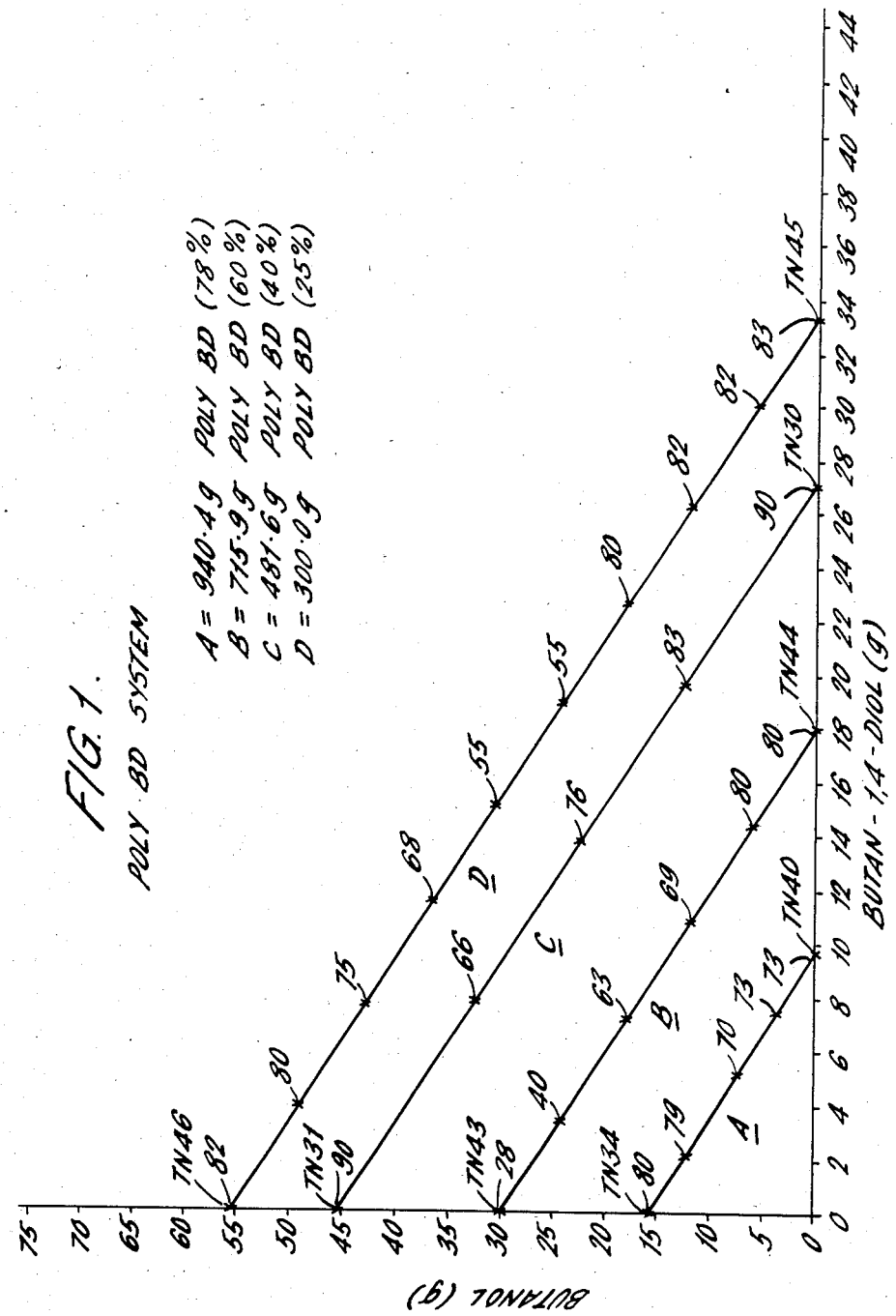

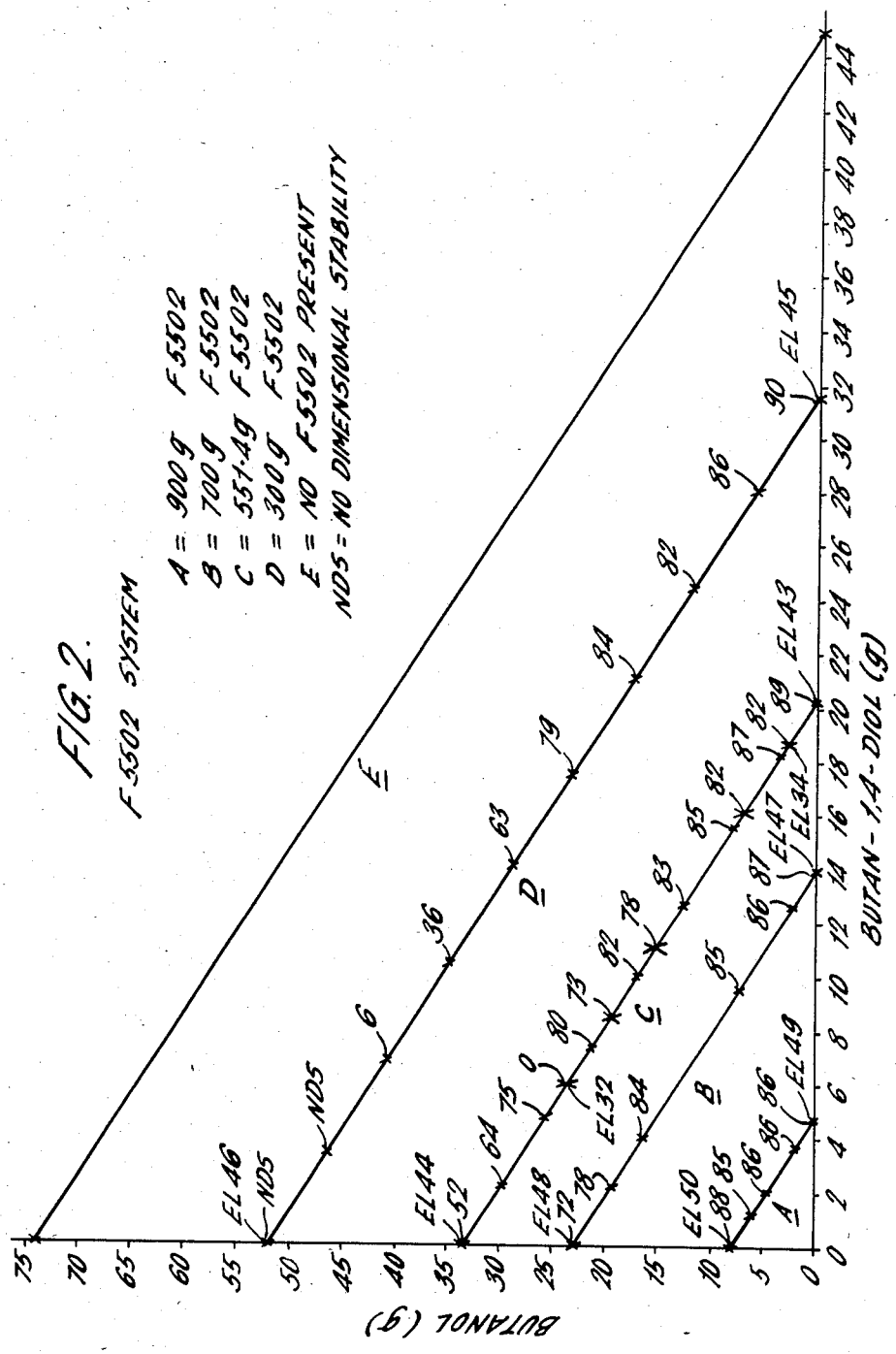

THERMOSETTING POLYURETHANES

The present invention relates to improvements in thermosetting polyurethanes and, in particular, to polyurethane products which are readily deformable, possessing delayed recovery characteristics. The soft deformable materials made in accordance with this invention are further characterised by having low compression set with high, temperature-insensitive damping over a broad temperature range.

Soft polyurethanes having delayed recovery, after compression, have been described in British Patent Specification No. 1564195. These polyurethanes contain free hydroxyl groups and are formed by reacting a polyol with an isocyanate in less than stoichiometric amount.

Soft polyurethane can also be produced by introducing a significant excess of polyisocyanate over that which is required for stoichiometric equivalence. The excess isocyanate acts as plasticiser, but can only do so if moisture is prevented from coming into contact with the product. Clearly such products have little practical value.

Accordingly, the present invention provides a thermoset polyurethane material which exhibits high, temperature-insensitive damping over a broad temperature range and has a tan δ (as hereinafter defined) greater than 0.1 over the temperature range of from −40° C. to 60° C., a hardness in the range of from 0 to 90 shore A, a compression set (as hereinafter defined) of less than 15% and a tensile strength (as hereinafter defined), of less than 30 kg/cm$^2$, the polyurethane material being prepared by the reaction of (a) an essentially primary hydroxyl tipped polyol having a molecular weight in the range of from 2,500 to 8,000;
(b) a polyhydric alcohol;
(c) an aliphatic monohydric primary alcohol containing up to 10 carbon atoms; and
(d) a polyisocyanate, the reaction being carried out at an isocyanate index of 1.0 or greater.

The thermoset polyurethane of the present invention has a tan δ, measured by the method as hereinafter defined, greater than 0.1, preferably greater than 0.2 and more preferably greater than 0.3, when measured over the temperature range of from −40° C. to 60° C.

The polyurethane of the present invention has a compression set, measured by the method as hereinafter defined, of less than 15% preferably less than 10%, and a tensile strength, measured by the method as hereinafter defined, of less than 30 kg/cm$^2$ preferably less than 20 kg/cm$^2$.

The polyol should have a functionality in the range of from 2 to 6, and preferably, 2 to 3. The polyol has a molecular weight in the range of from 2,500 to 8,000, preferably 2,500 to 4,000.

The soft, readily deformable polyurethanes which are the subject of the present invention may be formulated to improve their energy damping characteristics. Such materials are lightly crosslinked polyurethanes but, unlike polyurethanes described in British Patent Specification No. 1564195, are fully reacted so that, for all practical purposes, there is neither an excess of polyol nor of polyisocyanate. The polyurethanes of the present invention thus do not contain free hydroxyl groups.

As is known in the art, the rate of hardness build-up of a polyurethane is controlled by several factors, one of which is the isocyanate index. It is known, for example, that the hardness build-up is faster at an isocyanate index of 1.01 compared to the hardness build-up at an isocyanate index of 1.05. Hence an optimum may be regarded to exist at an isocyanate index of approximately 1.03. Similarly, as is known to those skilled in the art, the properties of polyurethanes may be modified by altering the structure of the polymer, or by introducing fillers and plasticisers, or by any combination of the aforementioned. The catalysts which may be used to form the polyurethanes of the present invention are those well known in polyurethane technology; for example, tertiary amines, derivatives of tin, lead, mercury, iron, nickel or cobalt, or synergistic blends of tertiary amines and one or more of the aforementioned metal derivatives.

The properties of the polyurethanes produced in accordance with the present invention are regulated by changing the ratio of the short chain diol to monohydric alcohol at a fixed or given polyol content. By doing so the hardness of the product may be varied from that of a dimensionally unstable semi-solid to that of solids having a hardness as high as 90 Shore A approximately. Products having a hardness of from 0 to 20 Shore A are preferred. The products are normally formed by carrying out the reaction at normal ambient temperature, but higher curing temperatures may be used to facilitate more rapid crosslinking. It will be appreciated that although stoichiometric amounts of polyisocyanates are preferred, it is possible to use slightly above the required amount of polyisocyanate without markedly affecting the properties of the products normally obtained.

Also, as is known in the art, the prepolymer route may be used to form the polyurethanes instead of the one-shot route described above. It is also possible to consider using an isocyanate-tipped prepolymer as a partial or total replacement for the polyisocyanate.

Examples of polyisocyanates which are suitable for use in accordance with the present invention include diphenylmethane diisocyanate (MDI); polymeric MDI; tolylene diisocyanate: cycloaliphatic diisocyanates, e.g. dicyclohexylmethane diisocyanate: hexamethylene diisocyanate; paraphenylene diisocyanate, and trans-1,4-cyclohexane diisocyanate.

The polyhydric alcohols which may be used in the present invention include glycerol; 1,4-butanediol, pentaerythritol; trimethylolpropane; 1,2-propylene glycol; 1,6 hexanediol; 2-ethyl hexane 1,3-diol, the bis (hydroxyethylether) of the hydroquinone and tetra functional polyhydric alcohols, such as 1, 1′, 1″, 1‴-ethylenedinitrilotetra-(2-propanol) sold commerically under the Trade Name of Pluriol Q by BASF. The polyhydric alcohol is preferably a short chain diol and those which are preferred for use in this invention are those in which all of the hydroxyl groups are primary hydroxyl groups, for example 1,4-butanediol. In some circumstances polyhydric alcohols can be used in which the hydroxyl groups are secondary, or a combination in the molecule of primary and secondary hydroxyl groups.

Examples of suitable aliphatic monohydric primary alcohols are $C_1$–$C_{10}$ aliphatic primary alcohols, particularly those in the range of $C_1$–$C_6$ i.e., methyl alcohol to n-hexanol. A monohydric ether alcohol of equivalent weight 155 known as Thinner PU made by Bayer AG is also suitable for this application. Other monohydric species, for example thiols or mercaptans, may also be incorporated as a partial or complete replacement for the aliphatic monohydric primary alcohols. Blends of aliphatic monohydric primary alcohols may also be used.

It will be understood by those skilled in the art that the polyurethanes of the present invention may be converted to cellular products by any of the means which are known in the art; for example by the release of gas which has been dissolved in the material by application of high pressure, or by the introduction of a low boiling point fluid, whose vapour pressure is markedly increased by either the external application of heat or by the chemical exotherm which occurs during polymerisation of the polyurethane or by the introduction of a reactive fluid, which causes a gas to be evolved, for example water, which upon reaction with the polyisocyanate causes carbon dioxide to be released. These cellular products may be substantially either open cell or closed-cell. Furthermore cellullar products with an integral skin may also be produced from the polyurethanes of the present invention. The methods of producing cellular materials using mechanical frothing and syntactic foams with microspheres are also suitable.

A convenient way which has been found to enable polyurethanes to be produced which cover a broad hardness range, without resorting to making a specific formulation for each hardness required, is to produce two master batch stocks from which, upon blending in the appropriate proportions, a material having intermediate properties may be obtained. This is further achieved by formulating each master batch of each pair in such a way that each one requires the same amount of polyisocyanates to give stoichiometric equivalence. Examples of this procedure are given later.

We have referred above to the fundamental role which the aliphatic monohydric primary alcohol, or blend of monohydric alcohols, play in the present invention. By systematically altering the structure of the monohydric alcohol a progressive change is observed in the compression set, the hardness and the elongation at break of the corresponding polyurethanes.

This is illustrated by the following Examples. In these Examples the following experimental techniques were used.

(1) TAN δ MEASUREMENTS

Tan δ which is defined as the loss factor in International Standard Reference Number 1S0 2856-1975 (E) is a measure of the damping behaviour of a material.

The measurements were made using a Dynamic Mechanical Thermal Analyser (DMTA) made by Polymer Laboratories, Church Stretton, England. The test conditions normally used were:

Bending mode
1 Hz Test Frequency
2° C./min Heating Rate
Start Temperature = −80° C.
Finish Temperature = +80° C.

(2) TENSILE STRENGTH AND ELONGATION

These were determined in accordance with the procedure described in B.S 903, Part A2 (1971)

(3) COMPRESSION SET

These measurements were made using B.S 903, Part A6 (1969) but the conditions were amended to: 25% strain at 40° C. for 20 hours.

(4) HARDNESS

The measurements were made using the hand held hardness meters made by Shore of the USA. Two hardness scales were normally used, Shore A and Shore 00. The extremes of these scales are the same, i.e. Shore A '0' is equivalent to Shore 00 '0' and Shore A '100' is equivalent to Shore 00 '100'. Shore 00 is used to measure the softer materials because the range Shore A 0–20 is covered by Shore 00 0–70 so that greater sensitivity is achieved.

In the Examples all parts and percentages are by weight unless otherwise stated.

EXAMPLE 1

Two master batch formulations designated TN43 and TN44 comprising the following were produced.

|  | TN43 (gm) | TN44 (gm) |
|---|---|---|
| Hydroxy-terminated polybutadiene | 715.9 | 715.9 |
| n-Butanol | 30.0 | 0.0 |
| 1,4 butanediol | 0.0 | 18.2 |
| Zeolith | 50.0 | 50.0 |
| Millicarb (Calcium Carbonate) | 325.2 | 325.2 |
| Dabco 33 LV (t-amine catalyst) | 4.0 | 4.0 |
| Silcolapse (Silicone antifoam) | 3.2 | 3.2 |
| Di-octyl phthalate | 271.7 | 283.5 |
| Total (gm) | 1,400 | 1,400 |
| Desmodur VL (crude MDI) | 140 | 1400 |
| Mix ratio weight/weight | 10.0:1.0 | 10.0:1.0 |

It should be noted that TN43 is the master batch which contains the monohydric alcohol. Derivative formulations of TN43 were produced whereby the n-butanol was replaced with a molecular equivalent quantity of methyl alcohol, ethyl alcohol, n-propanol, and n-hexanol. For the purposes of the present example a constant ratio of the two master batches was used, namely 6 to 4 respectively. It will be appreciated that in changing the monohydric alcohol the equivalent weight of the monohydric alcohol which is present in the formulation also changes. In order to obtain constancy of weight of the master batch formulation TN43, any slight adjustment necessary was made by altering the weight of di-octyl phthalate. TN43 was mixed with TN44 in the proportions of 6 to 4 parts by weight, respectively. Ten parts by weight of the combined master batch was mixed with one part by weight of Desmodur VL and the following properties were obtained:

TABLE 1

| Monohydric Alcohol | Tensile Strength kg/cm$^2$ | Elongation to break (%) | Compression 25% strain at 40° C. for 20 hrs. (%) | Shore 00 Hardness |
|---|---|---|---|---|
| methyl alcohol | 10.7 | 81.3 | 4.9 | 61 |
| ethyl alcohol | 8.9 | 72 | 6.9 | 57 |
| n-propanol | 14.0 | 93.3 | 9.0 | 43 |
| n-butanol | 9.3 | 105.7 | 9.2 | 45 |
| n-hexanol | 7.4 | 133.3 | 9.6 | 40 |

It can be seen from Table I that the compression set changes monotonically with increasing hydrocarbon chain length of the aliphatic alcohol.

The hardness of the product decreases as the chain length of the aliphatic alcohol increases, a plateau is reached with n-propanol and increasing the chain length does not significantly effect the hardness.

The elongation to break increases as the chain length increases.

EXAMPLE II

The product properties of the polyurethane material are influenced by changing the ratios of the reactive components viz the proportion of polyol: polyhydric alcohol: monofunctional primary alcohol.

The following examples show these effects using hydroxy terminated polybutadiene as the polyol, 1,4-butanediol as the polyhydric alcohol and n-butanol as the primary mono-functional alcohol.

The formulations are:

levels are 0.30 or above across the temperature range −60° C. to +60° C.

EXAMPLE III

This Example is to show the effect of the polyol on the properties of the polyurethane product. Examples of some commercially available polyols are given below:

| Type | Functionality | Primary Hydroxyl Content % | Molecular Weight |
|---|---|---|---|
| Arco Corporation R45-HT polybd | 2.5 | 100 | 3,000 |
| ICI Daltocel F2805 | 3 | 50–70 | 6,000 |
| ICI Daltocel F5502 | 3 | 40 | 3,000 |

| Formulation | TN45 | TN46 | TN32 | TN33 | TN43 | TN44 | TN34 | TN40 |
|---|---|---|---|---|---|---|---|---|
| Polybd | 300.0 | 300.0 | 481.6 | 481.6 | 715.9 | 715.9 | 940.4 | 940.4 |
| 1,4 butanediol | 33.8 | 0.0 | 22.5 | 7.7 | 0.0 | 18.2 | 0.0 | 9.85 |
| butanol | 0.0 | 55.5 | 7.4 | 31.8 | 30.0 | 0.0 | 16.2 | 0.0 |
| Zeolith | 50.0 | 50.0 | 50.0 | 50.0 | 50.0 | 50.0 | 50.0 | 50.0 |
| CaCO$_3$ | 118.8 | 118.8 | 211.3 | 201.7 | 325.2 | 325.2 | 432.4 | 435.2 |
| Dabco | 4.0 | 4.0 | 4.0 | 4.0 | 4.0 | 4.0 | 4.0 | 4.0 |
| Silcolapse | 3.2 | 3.2 | 3.2 | 3.2 | 3.2 | 3.2 | 3.2 | 3.2 |
| Di-octyl phthalate | 120.2 | 98.5 | 200.0 | 200.0 | 271.7 | 283.5 | 373.8 | 377.3 |
| TOTAL g | 630 | 630 | 980.0 | 980.0 | 1400 | 1400 | 1820.0 | 1820.0 |
| VL | 140 | 140 | 140.0 | 140.0 | 140.0 | 140.0 | 140.0 | 140.0 |
| mix ratio | 4.5:1 | 4.5:1 | 7.0:1 | 7.0:1 | 10.0:1 | 10.0:1 | 13.0:1 | 13.0:1 |
| % polybd* | 25 | 25 | 40 | 40 | 60 | 60 | 78 | 78 |
| % 1,4 butanediol | 75 | 0.0 | 50 | 17 | 0.0 | 40 | 0.0 | 22 |
| % butanol | 0.0 | 75 | 10 | 43 | 40 | 0.0 | 22 | 0.0 |

*These values are calculated by addition of the hydroxyl equivalents and calculating percentages after normalising to 1.0 hydroxy equivalent.

TABLE II

| Polybds % | 1,4-butane diol % | n-butanol % | Hardness Shore 00 | Formulation | TAN δ TEMPERATURE °C. | | | | | | |
|---|---|---|---|---|---|---|---|---|---|---|---|
| | | | | | −60 | −40 | −20 | 0 | 20 | 40 | 60 |
| 40 | 50 | 10 | 80 | TN32 + TN33 7 pts + 0 pts | .14 | .47 | .26 | .19 | .13 | .07 | .07 |
| 40 | 31 | 29 | 62 | TN32 + TN33 3 pts + 4 pts | .37 | .37 | .27 | .20 | .14 | .14 | .14 |
| 40 | 17 | 43 | 30 | TN32 + TN33 (0 pts + 7 pts) | .50 | .44 | .43 | .31 | .26 | .23 | .20 |
| 60 | 1 | 39 | 61 | TN43 + TN44 (9.5 pts + 0.5 pts) | .50 | .45 | .52 | .5 | .45 | .38 | .30 |

The effect of these formulation changes on the hardness of the product is shown in FIG. 1. It can be seen that a wide range of hardnesses can be produced by varying the ratio of the reactants.

Table II shows the effect of changing the butanediol to butanol ratio at the 40% polybd level on tan δ. The tan δ levels increase as the percentage of butanol is increased and at the high level of 39% butanol the tan δ

The above polyols are described as comprising the following
Polybd—Primary hydroxyl tipped polybutadiene
F2805—Ethylene oxide tipped poly(propylene glycol)
F5502—Ethylene oxide tipped poly(propylene glycol)

Examples of formulations based upon polybd are given in Examples I and II.

Examples of formulations based upon F5502 are given below.

The formulation of the F5502 series is:

| Formulation | EL32 | EL34 | EL43 | EL44 | EL45 | EL46 | EL47 | EL48 | EL49 | EL50 |
|---|---|---|---|---|---|---|---|---|---|---|
| F5502 | 551.4 | 551.4 | 551.4 | 551.4 | 300.0 | 300.0 | 700.0 | 700.0 | 900.0 | 900.0 |
| Butan-1-ol | 24.3 | 4.0 | 0.0 | 34.0 | 0.0 | 52.23 | 0.0 | 23.2 | 0.0 | 8.7 |
| 1,4-butanediol | 5.9 | 18.2 | 20.67 | 0.0 | 31.8 | 0.0 | 14.1 | 0.0 | 5.3 | 0.0 |
| Zeolith | 57.2 | 57.2 | 50.0 | 50.0 | 50.0 | 50.0 | 50.0 | 50.0 | 50.0 | 50.0 |
| CaCo$_3$ | 243.1 | 243.1 | 250.2 | 250.2 | 118.8 | 118.8 | 325.2 | 325.2 | 419.0 | 419.0 |
| Dabco | 4.57 | 4.57 | 4.0 | 4.0 | 4.0 | 4.0 | 4.0 | 4.0 | 4.0 | 4.0 |

-continued

| Formulation | EL32 | EL34 | EL43 | EL44 | EL45 | EL46 | EL47 | EL48 | EL49 | EL50 |
|---|---|---|---|---|---|---|---|---|---|---|
| Silcolapse | 3.66 | 3.66 | 3.2 | 3.2 | 3.2 | 3.2 | 3.2 | 3.2 | 3.2 | 3.2 |
| DOP* | 230.5 | 237.9 | 240.5 | 227.2 | 122.2 | 101.8 | 303.5 | 294.4 | 368.5 | 365.1 |
| Total g | 1120.6 | 1120 | 1120 | 1120 | 630 | 630 | 1400 | 1400 | 1750 | 1750 |
| VL** | 140 | 140 | 140 | 140 | 140 | 140 | 140 | 140 | 140 | 140 |
| Mix ratio | 8:1 | 8:1 | 8:1 | 8:1 | 4.5:1 | 4.5:1 | 10:1 | 10:1 | 12.5:1 | 12.5:1 |

*Di-octyl phthalate
**Desmodur VL

That of the series based upon F5502 comprises:
EL45 with EL46
EL43 with EL44
EL47 with EL48
EL49 with EL50

The hardness curves are shown in FIG. 2.

Other typical physical property data for a selection of products taken from the above series and for the TN series are given below.

TABLE III

| Mix ratio | Tensile Strength (kg/cm$^2$) | Elongation to break (%) | Compression (25% strain at 40° C. for 20 hrs.) |
|---|---|---|---|
| TN43 TN44 Isocyanate | | | |
| 0:10:1 | 4.1 | 285.0 | 5.8 |
| 4:6:1 | 7.5 | 130.0 | 7.8 |
| 9.5:0.5:1 | 11.3 | 62.0 | 20.7 |

TABLE IV

| Mix ratio | Tensile Strength (kg/cm$^2$) | Elongation break (%) | Compression (25% strain at 40° C. for 20 hrs) |
|---|---|---|---|
| EL43 EL44 Isocyanate | | | |
| 8:0:1 | 13.7 | 37.0 | 0.86 |
| 4:4:1 | 7.3 | 61.0 | 2.1 |
| 0:8:1 | 3.5 | 121.6 | 3.7 |

TABLE V

| Mix ratio | Tensile Strength (kg/cm$^2$) | Elongation to break (%) | Compression (25% strain at 40° C. for 20 hrs) |
|---|---|---|---|
| EL47 EL48 Isocyanate | | | |
| 10:0:1 | 10.8 | 36.7 | 0.86 |
| 3:7:1 | 6.5 | 52.0 | 2.31 |
| 0:10:1 | 4.3 | 61.7 | 3.16 |

TABLE VI

| Mix ratio | Tensile Strength (kg/cm$^2$) | Elongation to break (%) | Compression (25% strain at 40° C. for 20 hrs) |
|---|---|---|---|
| EL49 EL50 Isocyanate | | | |
| 12.5:0:1 | 9.0 | 32.0 | 0.57 |
| 6:6.5:1 | 8.8 | 46.0 | 0.56 |
| 0:12.5:1 | 14.4 | 48.3 | 1.45 |

The materials used in preparing the polyurethanes of the present invention are easy to dispense through conventional two-part dispensing and mixing equipment. By selecting the appropriate formulations, or combination of two master batches, for example EL45 and EL46, it is possible to vary the product from a hard, tough solid through to a semi-solid which has poor or negligible dimensional stability.

The semi-solids have applications in enclosed anti-vibration devices. The solids have similar applications where shock loading or energy requirements are encountered, and the low compression set grades have obvious uses in seals and other devices where resistance to set is important, particularly, but not exclusively, where this property is able to be combined with a low modulus in compression, for example less than 10 MN/m$^2$ at 50% compression and more particularly, less than 2 MN/m$^2$ at 50% compression.

We claim:

1. A thermoset polyurethane material which exhibits high, temperature-insensitive damping over a broad temperature range and has a tan δ (as hereinbefore defined) greater than 0.1 over the temperature range of from −40° C. to 60° C., a hardness in the range of from 0 to 90 Shore A, a compression set (as hereinbefore defined) of less than 15% and a tensile strength (as hereinbefore defined), of less than 30 kg/cm$^2$, the polyurethane material being prepared by the reaction of
   (a) an essentially primary hydroxyl tipped polyol having a molecular weight in the range of from 2,500 to 8,000;
   (b) a polyhydric alcohol;
   (c) an aliphatic monohydric primary alcohol containing up to 10 carbon atoms; and
   (d) a polyisocyanate, the reaction being carried out at a isocyanate index of 1.0 or greater.

2. A polyurethane material as claimed in claim 1 which is prepared from a polyol having a functionality in the range of from 2 to 6.

3. A polyurethane material as claimed in claim 1 which is prepared from a polyol having a functionality in the range of from 2 to 3.

4. A polyurethane material as claimed in claim 1 which is prepared from a polyol having a molecular weight in the range of from 2,500 to 4,000.

5. A polyurethane material as claimed claim 1 which is prepared from a polyhydric alcohol which is a short chain diol.

6. A polyurethane material as claimed in claim 5 which is prepared from 1,4-butanediol.

7. A polyurethane material as claimed in claim 1 which is prepared from a aliphatic monohydric primary alcohol which is a $C_1$–$C_6$ primary alcohol.

8. A polyurethane material as claimed in claim 1 which is prepared at an isocyanate index of approximately 1.03.

9. A polyurethane material as claimed in claim 1 which is prepared from two master batch stocks which are blended and then reacted with the polyisocyanate.

10. A polyurethane material as claimed in claim 1 which is prepared by replacing a portion of the polyol by a polyamine to give a polyurethane containing urea linkages.

11. A polyurethane material as claimed in claim 1 which is prepared by replacing at least a portion of the monohydric alcohol by a thiol or mercaptan.

12. A polyurethane material as claimed in claim 1 which has a tan δ greater than 0.3 over the temperature range of from −40° C. to 60° C.

13. A polyurethane material as claimed in claim 1 which has a hardness in the range of 0 to 20 Shore A.

14. A polyurethane material as claimed in claim 1 which has a tensile strength of less than 20 kg/cm$^2$.

15. A polyurethane material as claimed in claim 1 which has a compression set at room temperature of less than 10%.

* * * * *